(No Model.)
F. A. POTTER.
FRUIT JAR.
No. 470,366. Patented Mar. 8, 1892.
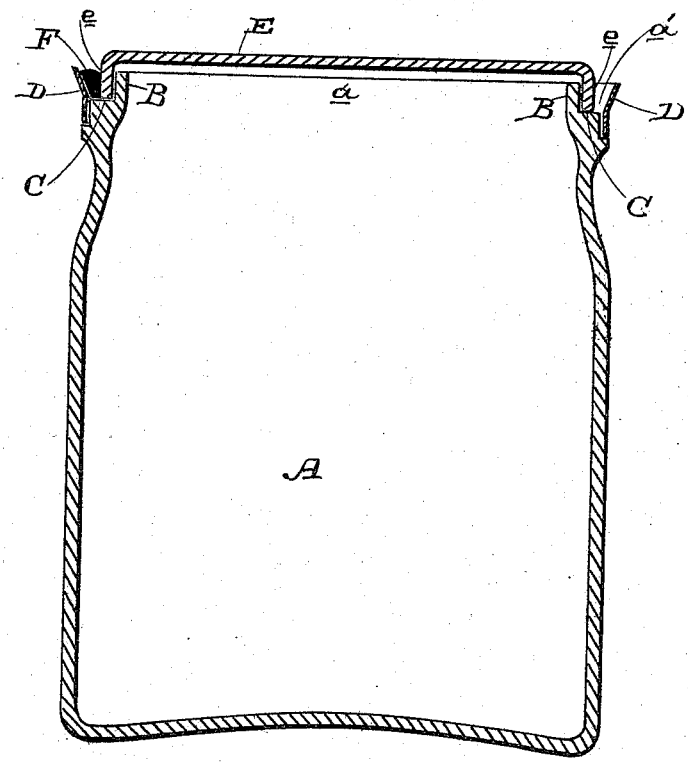
Witnesses,
Inventor,
Francis A. Potter
By Dewey & Co.
Attys

UNITED STATES PATENT OFFICE.

FRANCIS ALBERTUS POTTER, OF SAN FRANCISCO, CALIFORNIA, ASSIGNOR OF ONE-HALF TO GUSTAV WIHL AND WILLIAM DIEFFENBACHER, OF SAME PLACE.

FRUIT-JAR.

SPECIFICATION forming part of Letters Patent No. 470,366, dated March 8, 1892.

Application filed September 2, 1891. Serial No. 404,553. (No model.)

*To all whom it may concern:*

Be it known that I, FRANCIS ALBERTUS POTTER, a citizen of the United States, residing in the city and county of San Francisco, State of California, have invented an Improvement in Fruit-Jars; and I hereby declare the following to be a full, clear, and exact description of the same.

My invention relates to the class of hermetically-sealed vessels, and especially to fruit-jars made of glass.

My invention consists in a glass jar formed with a flange surrounding its orifice and an exterior ledge, a separate band or ring secured to the periphery of the jar and bounding the ledge, and a glass cover with its rim fitting down over the orifice-flange into the annular channel formed between said flange and ring or band, said rim resting on the ledge and raising the cover above and free of the orifice-flange, as I shall hereinafter fully describe.

For hermetically-sealed goods it is very desirable to use glass jars and glass covers. These are universally recognized as being the best for such goods, as many people demand that nothing but glass shall come in contact with the contents of the vessels; but the difficulty has been to make a glass cover fit tightly to a glass jar, and especially to one having a large mouth or opening, and in those cases in which this result has been attained another difficulty has presented itself—namely, that of getting the cover off.

The object of my invention is to provide a simple and practicable construction whereby a glass cover can be tightly fitted and sealed to a glass jar and can be easily removed when desired, said jar having also as wide a mouth or opening as may be required.

Referring to the accompanying drawing for a more complete explanation of my invention, the figure is a vertical section of my fruit-jar, one side of the cover being broken away and shown in dotted lines.

A is a glass jar, having a mouth or opening *a* of as great a diameter as may be desired. Encircling this opening is a vertical flange B, formed with the jar, and said jar is also formed with a ledge C outside of the flange.

D is a band or ring separate from the jar. It may be made of any suitable material, sheet metal being preferred. It is fitted around and is firmly secured in a suitable manner to the periphery of the jar and bounds the ledge C. It projects above said ledge, and its top, though it may be made straight, is preferably made outwardly inclined or flaring, as shown, in order to permit the easy insertion of a disengaging-instrument under the cover when it is desired to remove it. Thus an annular channel *a'* is formed between the flange B and separate band or ring D, of which the ledge C forms the bottom.

E is the glass cover, having a downwardly-extending rim *e*. The cover fits over the opening or mouth *a* of the jar, its rim fitting down over the flange B and into the annular channel *a'*. The rim *e* of the cover rests upon the ledge C and supports the cover above and free of the flange B surrounding the mouth-orifice *a*. This permits the cover to be easily forced off by the insertion of a pointed implement under its rim, said cover being moved from its place without binding or cramping on the flange B, which it does not touch. This arrangement of the cover-rim by having its base resting on ledge C excludes the sealing material from getting within the rim, and consequently it has no tendency to stick to the orifice-flange, thereby permitting its easy removal. The sealing material—such as the ring of wax F—is laid in the annular channel and lies between the cover-rim and the outer ring or band D. When melted, it fills this channel and forms a tight joint.

I am aware that in metal cans a cover fits down into an annular channel and is sealed therein; but it is impractical to make jars of glass with the proper channel. By my construction, however, I am enabled to make the glass jar in such a shape with its flange and ledge, as described, that by securing to the periphery of the jar the separate band or ring D the complete and proper channel is formed. This band or ring may be metal, because it does not come in contact with the contents of the jar and there is nothing exposed to the fruit but glass.

The cover can be easily sealed in place and readily removed, and the mouth of the jar may be as large as desired.

Having thus described my invention, what I claim as new, and desire to secure by Letters Patent, is—

An improved fruit-jar consisting of a glass jar having a flange surrounding its orifice, annular ledges surrounding the neck of the jar in different planes, a separable band or ring seated upon the lower ledge, and a glass cover having a flange whose inner wall bounds the orifice-flange of the jar and whose lower edge rests upon the upper ledge, said cover having the inner wall of its top portion elevated above and out of contact with the top edge of the orifice-flange, whereby said cover may be readily removed, as herein described.

In witness whereof I have hereunto set my hand.

FRANCIS ALBERTUS POTTER.

Witnesses:
S. H. NOURSE,
J. A. BAYLESS.